No. 663,744. Patented Dec. 11, 1900.
F. P. FELTER.
MOTOR PLOW.
(Application filed Sept. 7, 1900.)

(No Model.) 2 Sheets—Sheet 1.

WITNESSES:
Joshua Bergstrom
C. R. Ferguson

INVENTOR
Frank P. Felter.
BY
ATTORNEYS

THE NORRIS PETERS CO., PHOTO-LITHO., WASHINGTON, D. C.

No. 663,744.  
F. P. FELTER.  
MOTOR PLOW.  
(Application filed Sept. 7, 1900.)  
(No Model.)  
Patented Dec. 11, 1900.  
2 Sheets—Sheet 2.
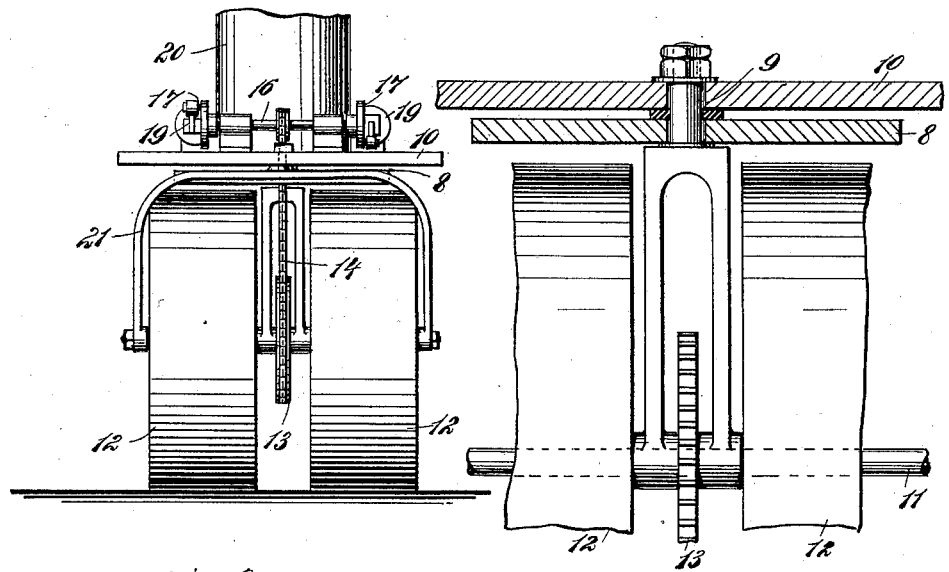
Fig. 3.  
Fig. 5.
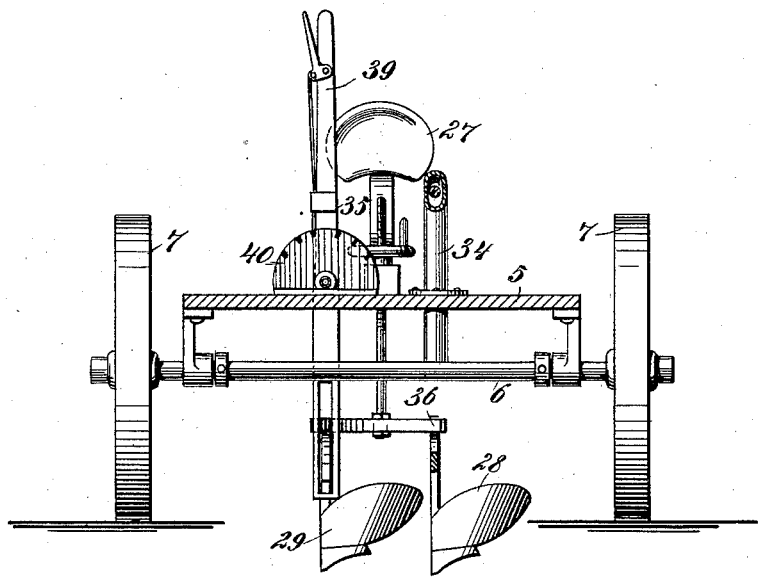
Fig. 4.
WITNESSES:  
INVENTOR  
Frank P. Felter.  
BY  
ATTORNEYS

UNITED STATES PATENT OFFICE.

FRANK P. FELTER, OF HAVERSTRAW, NEW YORK.

MOTOR-PLOW.

SPECIFICATION forming part of Letters Patent No. 663,744, dated December 11, 1900.

Application filed September 7, 1900. Serial No. 29,297. (No model.)

*To all whom it may concern:*

Be it known that I, FRANK P. FELTER, a citizen of the United States, and a resident of Haverstraw, in the county of Rockland and State of New York, have invented a new and Improved Motor-Plow, of which the following is a full, clear, and exact description.

This invention relates to improvements in plows or similar agricultural implements; and the object is to provide a plow or the like with a motor for moving it over the ground, and, further, to so construct the device that it may be easily steered and the plow raised and lowered as desired.

I will describe a motor-plow embodying my invention and then point out the novel features in the appended claims.

Reference is to be had to the accompanying drawings, forming a part of this specification, in which similar characters of reference indicate corresponding parts in all the figures.

Figure 1:
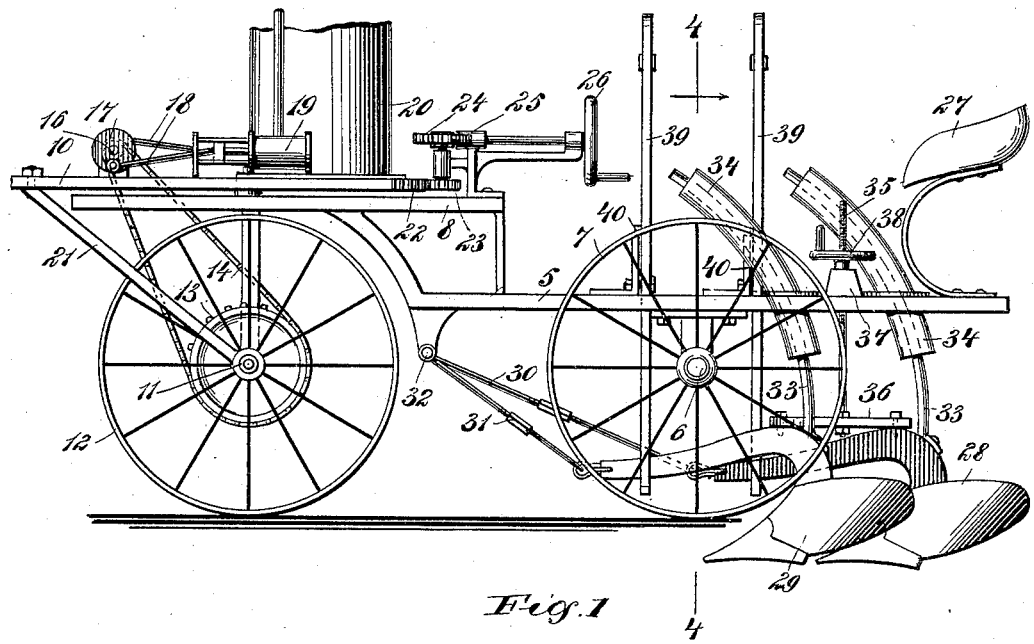
Figure 2:
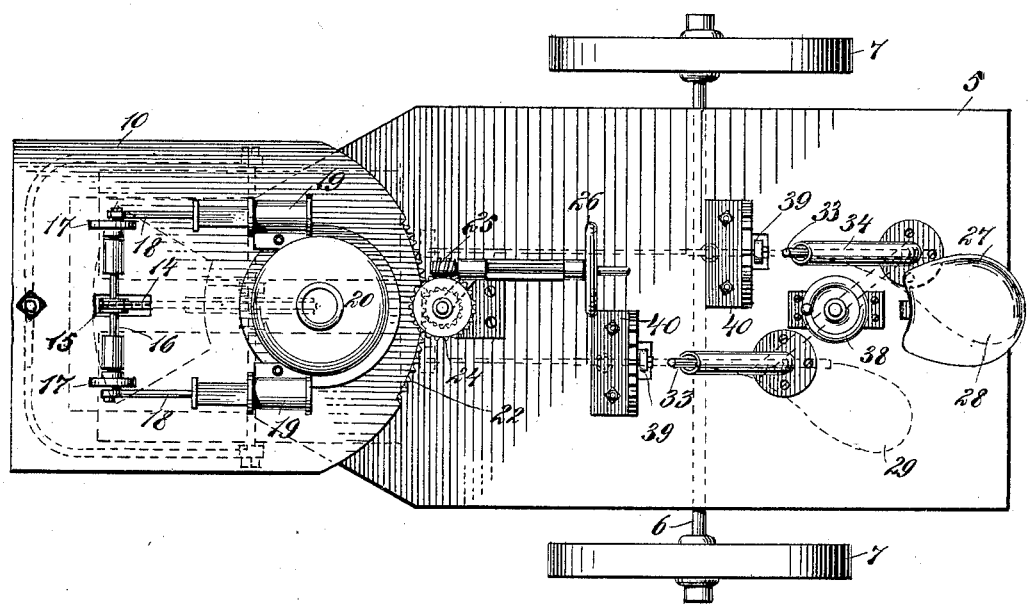

Figure 1 is a side elevation of a plow embodying my invention. Fig. 2 is a plan. Fig. 3 is a front view. Fig. 4 is a section on the line 4 4 of Fig. 1, and Fig. 5 is a sectional view of a portion of the steering mechanism.

Referring to the drawings, 5 designates a platform supported on an axle 6, to which the wheels 7 are attached. A continuation 8 at the front end of the platform is raised above the plane of said platform 5, and mounted to turn in this extension-platform 8 is a king-bolt 9, the upper end of said king-bolt being rigidly secured to a platform 10, mounted to turn in a horizontal plane. The lower portion of the king-bolt is made in two sections the lower ends of which have bearings through which the shaft 11 of the two traction-wheels 12 pass, and connected with the shaft between the two members of the said king-bolt is a sprocket-wheel 13, from which a driving-chain 14 extends to a sprocket-wheel 15 on a driving-shaft 16, having bearings in uprights attached to the platform 10. At the ends of this driving-shaft 16 are crank-wheels 17, the wrist-pins of which are engaged by piston-rods 18, connected to pistons operating in cylinders 19, attached to the upper side of the platform 10 and to which steam is supplied from the boiler 20.

A brace-bar 21 is connected at its center to the forward end of the turnable platform 10, and its side members are carried outward and rearward and connect with the axle 11. The platform 10 is designed to be turned to direct the wheels 12 in the desired course. I have here shown the platform 10 as provided at its rear end with a rack 22, engaged by a pinion 23, on the shaft of which is a worm-wheel 24, engaged by a worm 25, and on the shaft of this worm 25 is a crank or hand wheel 26. By this construction a person in a seat 27 may easily direct the plow or vehicle by rotating said crank-wheel 26.

Arranged beneath the platform 5 are two plows 28 and 29. The forward ends of the beams of these plows have link connections 30 and 31 with a cross-bar 22, supported by hangers on the under side of the platform 5, near its forward end. From the rear ends of the plow-beams curved rods 33 extend upward through curved tubular guides 34, which project through the platform 5, as plainly shown in the drawings. These connections will permit the plows to rise and fall, but they will be prevented from lateral movement. The plows may be raised or lowered by a screw-shaft 35, connecting with a bar 36, attached to the plow-beams near the rear end. This screw-rod 35 extends upward through a block 37 on the platform, and above this block the thread of the rod is engaged by a screw-wheel 38.

As a means for shifting the plows to bring their points somewhat at an angle to the forward movement of the machine I employ shifting-levers 39. These shifting-levers 39 extend through openings in the platform 5 and have openings at their lower ends through which the plow-beams loosely pass. These shifting-levers are pivoted to plates 40, arranged on the upper side of the platform 5, and clutch-pawls mounted on the said levers 39 in the usual manner are adapted to engage with racks formed on the top of the plates 40, so as to hold the levers in their adjusted position.

In operation it is obvious that a person in the seat 27 may easily direct the movements of the plow, as well as shift the points thereof, as above mentioned, and regulate their depth of penetration.

Having thus described my invention, I claim as new and desire to secure by Letters Patent—

1. An agricultural implement, comprising a carriage, a motor mounted on the carriage, plows arranged underneath the rear portion of the carriage-platform, link connections between the plow-beams and said platform, a bar connecting the beams of opposite plows, curved rods extended upward from said beams at their rear ends, curved guide-tubes attached to the platform and through which said rods pass, and means connecting with said cross-bar for raising or lowering the plows, substantially as specified.

2. An agricultural implement, comprising a carriage, a motor carried by the carriage, means for turning the front wheels of the carriage for steering the plow, two plows arranged beneath the carriage-platform, link connections between the beams of said plows, and the carriage-platform, curved guide-rods extended from said beams, curved guide-tubes supported by the platform and through which said rods move, a bar connection between the beams of the two plows, a screw-rod extended upward from said bar through a block on the platform, and a screw-wheel engaging with said rod, substantially as specified.

In testimony whereof I have signed my name to this specification in the presence of two subscribing witnesses.

FRANK P. FELTER.

Witnesses:
JNO. M. RITTER,
C. R. FERGUSON.